United States Patent
Gao et al.

(10) Patent No.: US 12,267,515 B2
(45) Date of Patent: Apr. 1, 2025

(54) METHOD AND APPARATUS FOR TEMPORAL INTERPOLATED PREDICTION IN VIDEO BITSTREAM

(71) Applicant: TENCENT AMERICA LLC, Palo Alto, CA (US)

(72) Inventors: Han Gao, San Diego, CA (US); Xin Zhao, Sunnyvale, CA (US); Liang Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 182 days.

(21) Appl. No.: 17/982,071

(22) Filed: Nov. 7, 2022

(65) Prior Publication Data

US 2023/0388529 A1 Nov. 30, 2023

Related U.S. Application Data

(60) Provisional application No. 63/345,329, filed on May 24, 2022.

(51) Int. Cl.
*H04N 19/44* (2014.01)
*H04N 19/137* (2014.01)
(Continued)

(52) U.S. Cl.
CPC ........... *H04N 19/44* (2014.11); *H04N 19/137* (2014.11); *H04N 19/176* (2014.11); *H04N 19/513* (2014.11); *H04N 19/70* (2014.11)

(58) Field of Classification Search
CPC .... H04N 19/44; H04N 19/137; H04N 19/176; H04N 19/513; H04N 19/70
(Continued)

(56) References Cited

U.S. PATENT DOCUMENTS

2006/0039476 A1* 2/2006 Watanabe ............ H04N 19/132
375/240.24
2011/0170597 A1 7/2011 Shi et al.
(Continued)

OTHER PUBLICATIONS

Gao et al., ("Decoder-Side Motion Vector Refinement in VVC: Algorithm and Hardware Implementation Considerations." First published Nov. 2020. IEEE Transactions on Circuits and Systems for Video Technology, vol. 31, No. 8, pp. 3197-3211. (Year: 2020).*
(Continued)

*Primary Examiner* — Zaihan Jiang
*Assistant Examiner* — Kristin Dobbs
(74) *Attorney, Agent, or Firm* — Sughrue Mion, PLLC

(57) ABSTRACT

A video decoder is provided for the decoding of a video bitstream encoded in a temporal interpolated prediction (TIP) mode. First and second motion vectors pointing to respective reference frames, or reference pictures within those frames, are generated for a block of a current picture. The motion vectors are then refined by application of a decoder-side motion vector refinement (DMVR) process, based on a bilateral matching process, and the refined motion vectors are used to decode the block. The refinement may more specifically involve consideration of candidates for the refined motion vectors, selected by the bilateral matching. The refinement may be applied at both block and sub-block divisions of the current picture.

20 Claims, 15 Drawing Sheets

(51) Int. Cl.
    *H04N 19/176*  (2014.01)
    *H04N 19/513*  (2014.01)
    *H04N 19/70*   (2014.01)

(58) Field of Classification Search
    USPC .................................................. 375/240.25
    See application file for complete search history.

(56) References Cited

U.S. PATENT DOCUMENTS

2012/0127270 A1    5/2012  Zhang et al.
2021/0185338 A1*   6/2021  Xiu ..................... H04N 19/176

OTHER PUBLICATIONS

International Search Report dated Apr. 7, 2023 in International Application No. PCT/US22/49385.
Written Opinion dated Apr. 7, 2023 in International Application No. PCT/US22/49385.
Gao et al. "Decoder-Side Motion Vector Refinement in VVC: Algorithm and Hardware Implementation Considerations." First published Nov. 2020. IEEE Transactions on Circuits and Systems for Video Technology, vol. 31, No. 8, pp. 3197-3211. 18 pages total. doi: 10.1109/TCSVT.2020.3037024.

* cited by examiner

METHOD AND APPARATUS FOR TEMPORAL INTERPOLATED PREDICTION IN VIDEO BITSTREAM

RELATED PATENTS AND APPLICATIONS

This application is based on, and claims the benefit of priority of, U.S. Provisional Patent Application No. 63/345,329, filed on May 24, 2022, which is incorporated by reference herein in its entirety.

BACKGROUND

1. Field

The present disclosure relates generally to video encoding and decoding, and more particularly to methods and apparatuses for improving motion field accuracy by use of temporal interpolated prediction.

2. Description of Related Art

Video encoding and decoding is widely used with the proliferation of connected devices and digital media generally. AOMedia Video 1 (AV1) is an open video coding format designed for video transmissions over the Internet. Many of the components of the AV1 project were sourced from previous research efforts. While AV1 is an improvement over existing solutions, such as its predecessor codec, VP9, problems with interpolation still exist. Therefore, there is a need for further improvement.

SUMMARY

In accordance with certain embodiments of the present disclosure, a method for decoding of a coded video bitstream is provided. The method is performed by at least one processor in a video decoder. The method includes receiving a coded video bitstream including a current picture that includes at least one block and a syntax element indicating that the at least one block is to be predicted in a temporal interpolated prediction (TIP) mode. The method further includes generating, for the at least one block, a motion field that includes a first motion vector that points to a first reference picture and a second motion vector that points to a second reference picture. The method further includes generating a first refined motion vector and a second refined motion vector by using the first motion vector and the second motion vector in a decoder-side motion vector refinement (DMVR) process for the at least one block, based on a bilateral matching process. The method further includes decoding the at least one block using the first refined motion vector and the second refined motion vector.

In accordance with other embodiments of the present disclosure, a video decoder is provided. The video decoder includes at least one communication module configured to receive a bitstream, at least one non-volatile memory electrically configured to store computer program code, and at least one processor operatively connected to the at least one communication module and the non-volatile memory. The at least one processor is configured to operate as instructed by the computer program code. The computer program code includes receiving code configured to cause at least one of the at least one processor to receive, through the at least one communication module, a coded video bitstream including a current picture that includes at least one block and a syntax element indicating that the at least one block is to be predicted in a temporal interpolated prediction (TIP) mode. The computer program code further includes generating code configured to cause at least one of the at least one processor to generate, for the at least one block, a motion field that includes a first motion vector that points to a first reference picture and a second motion vector that points to a second reference picture. The computer program code further includes refining code configured to cause at least one of the at least one processor to generate a first refined motion vector and a second refined motion vector by using the first motion vector and the second motion vector in a decoder-side motion vector refinement (DMVR) process for the at least one block, based on a bilateral matching process. The computer program code further includes decoding code configured to cause at least one of the at least one processor to decode the at least one block using the first refined motion vector and the second refined motion vector.

In accordance with still other embodiments of the present disclosure, a non-transitory computer-readable recording medium is provided. The recording medium has recorded thereon instructions executable by at least one processor to perform a method for decoding of a coded video bitstream. The method includes receiving a coded video bitstream including a current picture that includes at least one block and a syntax element indicating that the at least one block is to be predicted in a temporal interpolated prediction (TIP) mode. The method further includes generating, for the at least one block, a motion field that includes a first motion vector that points to a first reference picture and a second motion vector that points to a second reference picture. The method further includes generating a first refined motion vector and a second refined motion vector by using the first motion vector and the second motion vector in a decoder-side motion vector refinement (DMVR) process for the at least one block, based on a bilateral matching process. The method further includes decoding the at least one block using the first refined motion vector and the second refined motion vector.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
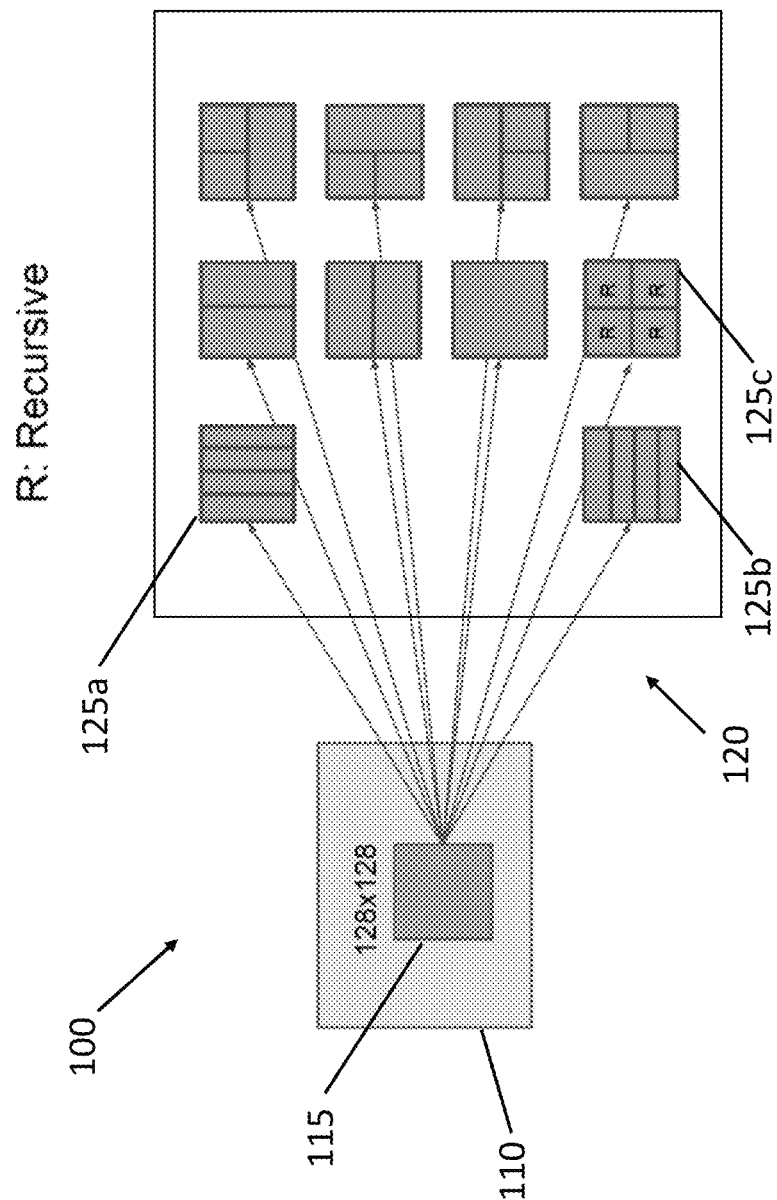
FIG. 1 depicts an illustrative example of AV1 tree partitioning, in accordance with an exemplary embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

With the current proliferation of media accessibility through the internet, video encoding has become more important to reduce network load. Disclosed within, are methods and apparatuses for video encoding.

FIG. 1 depicts an illustrative example of an AV1 partition tree 100, in accordance with an exemplary embodiment. In a partition tree 100 for an image 110, a portion 115 (referred to as a superblock in VP9/AV1 parlance) of the image 110 is expanded to a ten-way structure 120, partitioning the superblock 115 according to various partition patterns (e.g. 125a, 125b, 125c) which can each be processed. While the partition patterns using rectangular partitions may not be further subdivided, partition pattern 125c consists solely of square patterns, which can themselves be partitioned in the same manner as the superblock 115, resulting in a recursive partitioning.

A partition or block of this process may also be termed a coding tree unit (CTU), and a group of pixels or pixel data units collectively represented by a CTU may be termed a coding tree block (CTB). It is noted that a single CTU may represent multiple CTBs, where each CTB represents different components of information (e.g. a CTB for brightness information and multiple CTBs for different color components such as "red," "green," and "blue" factors).

AV1 increases the largest possible size of the starting superblock 115 to, for example, 128×128 pixels, as compared to a 64×64-pixel superblock in VP9. Also, the ten-way structure 120 includes 4:1 and 1:4 rectangular partition patterns 125a and 125b that did not exist in VP9. In addition, AV1 adds more flexibility to the use of partitions below an 8×8-pixel level, in the sense that 2×2 chroma inter prediction now becomes possible in certain cases.

In High Efficiency Video Coding (HEVC), a coding tree unit may be split into coding units (CUs) by using a quadtree structure denoted as a coding tree to adapt to various local characteristics. The decision on whether to code a picture area using inter-picture (temporal) or intra-picture (spatial) prediction may be made at the CU level. Each CU may be further split into one, two or four prediction units (PUs) according to the PU splitting type. Inside one PU, the same prediction process may be applied and the relevant information may be transmitted to the decoder on a PU basis. After obtaining the residual block by applying the prediction process based on the PU splitting type, a CU may be partitioned into transform units (TUs) according to another quadtree structure like the coding tree for the CU. A HEVC structure has multiple partition conceptions including CU, PU, and TU. In HEVC, a CU or a TU may be square-shaped, while a PU may be square-shaped or rectangular-shaped for an inter predicted block. In HEVC, one coding block may be further split into four square sub-blocks, and transform may be performed on each sub-block, i.e., TU. Each TU may be further split recursively (using quadtree split) into smaller TUs, which is called Residual Quad-Tree (RQT). At a picture boundary, HEVC may employ an implicit quad-tree split such that a block may keep quad-tree splitting until the size fits the picture boundary.

Figure 2:
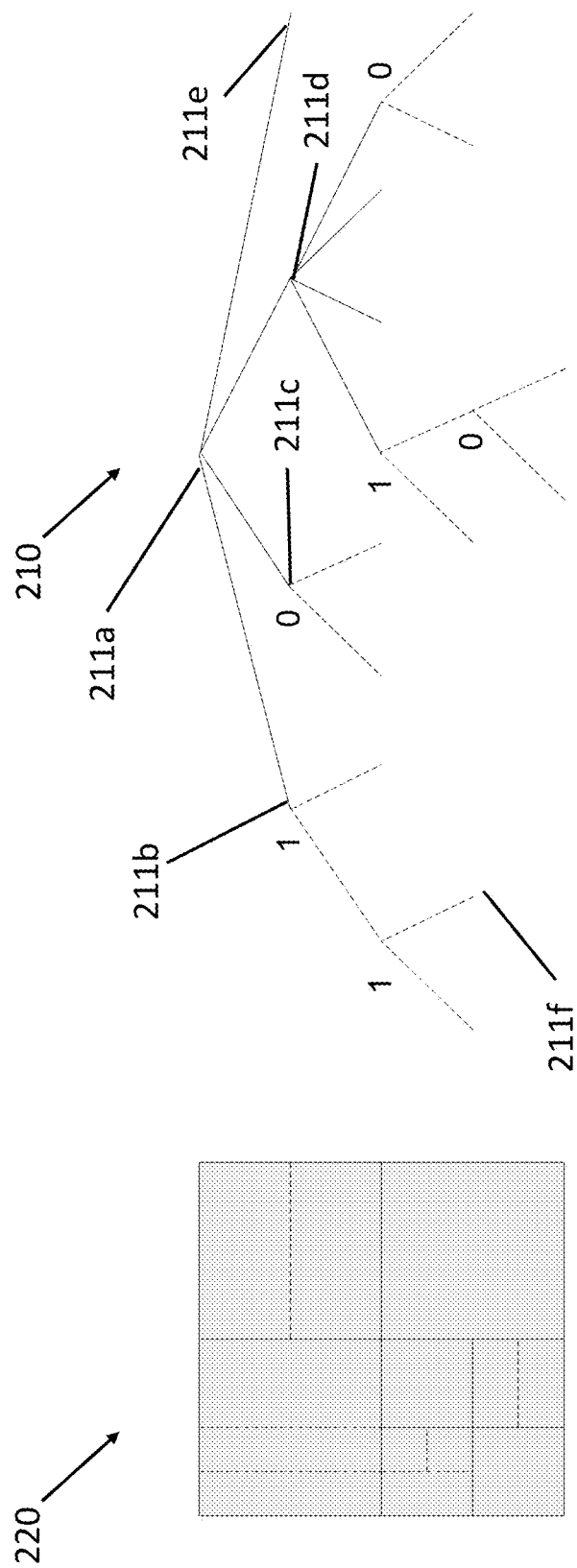
FIG. 2 depicts an illustrative example of portioning of a block using a quad-tree plus binary tree structure, in accordance with an exemplary embodiment.

FIG. 2 depicts an illustrative example of portioning of a CTU 220 using a quad-tree plus binary tree (QTBT) structure 210, in accordance with an exemplary embodiment. The QTBT structure 210 includes both quadtree nodes and binary tree nodes. In FIG. 2, solid lines indicate branches and leafs, and the corresponding block divisions, resulting from division at a quadtree node, such as node 211a, and dotted lines indicate branches and leafs, and the corresponding block divisions, resulting from division at a binary tree node, such as node 211b.

Splitting at a binary tree node divides a corresponding block into two sub-blocks of equal size. For each splitting (i.e., non-leaf) binary tree node (e.g. node 211b), a flag or other indicia may be used to indicate which splitting type (i.e., horizontal or vertical) is used, where, for example, 0 indicates horizontal splitting and 1 indicates vertical splitting. Splitting at a quadtree node (e.g. node 211a) divides a corresponding block both horizontally and vertically into four sub-blocks of equal size, and therefore a flag to indicate the splitting type may be omitted.

In addition, the QTBT scheme supports the flexibility for the luma and chroma to have a separate QTBT structure. For P and B slices, the luma and chroma CTBs in one CTU may share the same QTBT structure. However, for I slices, the luma CTB may be partitioned into CUs by a QTBT structure, and the chroma CTBs may be partitioned into chroma CUs by a different QTBT structure. This means that a CU in an I slice may include a coding block of the luma component or coding blocks of two chroma components, and a CU in a P or B slice may include coding blocks of all three color components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in certain embodiments, these restrictions are removed.

In HEVC, a CTU may be split into CUs by using a quadtree denoted as a coding tree to adapt to various local characteristics. The decision on whether to code a picture area using inter-picture (temporal) or intra-picture (spatial) prediction may be made at the CU level. Each CU may be further split into one, two, or four PUs according to the PU splitting type. Inside one PU, the same prediction process may be applied and the relevant information may be transmitted to the decoder on a PU basis. After obtaining the residual block by applying the prediction process based on the PU splitting type, a CU may be partitioned into transform units (TUs) according to another quadtree structure as with the coding tree for the CU. The HEVC structure may therefore have multiple partition conceptions including CUs, PUs, and TUs.

According to the embodiment depicted in FIG. 2, the QTBT structure 210 removes the concepts of multiple partition types, i.e. it removes the separation of the CU, PU and TU concepts, and supports more flexibility for CU partition shapes. In the QTBT block structure, a CU may have either a square or rectangular shape. As shown in FIG. 2, a coding tree unit (CTU) 220 may be first partitioned according to a quadtree node 211a of QTBT structure 210. The branches of quadtree node 211a may be further partitioned according to a binary tree node (e.g. nodes 211b and 211c) or another quadtree node (e.g. node 211d). There may be two splitting types, symmetric horizontal splitting and symmetric vertical splitting, in the binary tree splitting. The binary tree leaf nodes may be designated as coding units (CUs), and that segmentation may be used for prediction and transform processing without any further partitioning. This means that the CU, PU and TU may have the same block size in the QTBT coding block structure.

In certain embodiments, a CU may include coding blocks (CBs) of different color components (e.g. one CU may contain one luma CB and also two chroma CBs, in the case of P and B slices of the 4:2:0 chroma format) or may alternatively include a CB of a single component (e.g., one CU may contain either one luma CB or two chroma CBs, in the case of I slices).

The following parameters are defined for the QTBT partitioning scheme.
 CTU size: the root node size of a quadtree, the same concept as in HEVC
 MinQTSize: the minimum allowed quadtree leaf node size
 MaxBTSize: the maximum allowed binary tree root node size
 MaxBTDepth: the maximum allowed binary tree depth
 MinBTSize: the minimum allowed binary tree leaf node size In an example implementation of the QTBT partitioning structure, the CTU 220 size may be set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4.

In such an implementation, quadtree partitioning is applied to the CTU 220, a represented by quadtree root node 211a, to generate quadtree leaf nodes 211b, 211c, 211d, and 211e. The quadtree leaf nodes 211b, 211c, 211d, and 211e may have a size from 16×16 (i.e., the MinQTSize) to 128×128 (i.e., the CTU size). If a leaf quadtree node size is 128×128, it will not be further split by a binary tree as the size exceeds the MaxBTSize (i.e., 64×64). Otherwise, the leaf quadtree node may be further partitioned by the QTBT partitioning structure 210. Therefore, the quadtree leaf node 211b may also be treated as a root node for a binary tree with a binary tree depth of 0.

When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered.

Once splitting has ceased, the final leaf nodes of the QTBT partitioning structure 210 (e.g. leaf node 211f) may be further processed by prediction and transform processing. In certain embodiments, the maximum CTU size is 256×256 luma samples.

Figure 3:
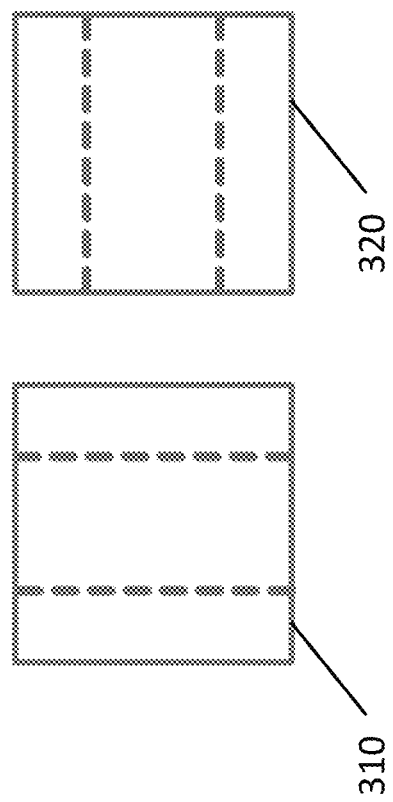
FIG. 3 depicts an illustrative example of block partitioning structures using a ternary tree, in accordance with an exemplary embodiment.

FIG. 3 depicts an illustrative example of block partitioning structures using ternary trees, such as a VVC Multi-type-tree (MTT) structure, in accordance with an exemplary embodiment. Adding the use of ternary trees to a partitioning structure, with flags or indicia similar to those used in binary tree nodes, enables both vertical 310 and horizontal 320 center-side triple-tree partitions, in addition to the partitions enabled by the above QTBT partitioning structure. The triple-tree partitioning complements the quadtree and binary-tree partitioning: triple-tree partitioning may capture objects located in the center of the block which would be divided by a quadtree or binary-tree partition. The width and height of the triple-tree partitions may each be a power of 2, removing the need for additional transforms.

Theoretically, the complexity of a traversal of a tree is $T^D$, where T denotes the number of split types, and D is the depth of the tree. As such, for reasons of complexity reduction, the tree may be a two-level tree (D=2).

Figure 4:
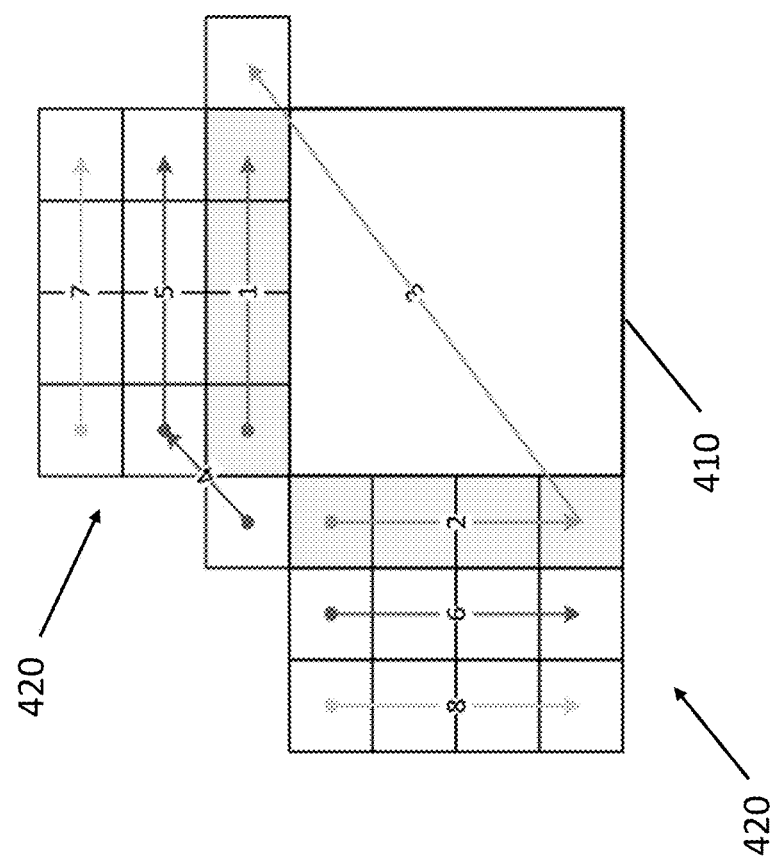
FIG. 4 depicts an illustrative operation of deriving a spatial motion vector predictor, in accordance with an exemplary embodiment.

FIG. 4 depicts an illustrative operation of deriving a spatial motion vector predictor, in accordance with an exemplary embodiment. A spatial motion vector predictor (SVMP) may itself take the form of a motion vector, or otherwise include a motion vector. The SVMP may be derived from blocks which neighbor a current block 410. More specifically, an SVMP may be derived from spatial neighboring blocks 420 which are either adjacent or otherwise close to the current block 410 at the top and left sides. For example, in FIG. 4, a block is a spatial neighboring block 420 if it is in the three rows of blocks directly above the current block 410, or if it is the three columns of blocks directly to the left of the current block 410, or if it is immediately to the left or right of the row immediately adjacent to the top of the current block 410. The spatial neighboring blocks 420 may be a regular size which is smaller than the current block 410. For example, in FIG. 4, the current block 410 is a 32×32 block, and each spatial neighboring block 420 is an 8×8 block.

The spatial neighboring blocks 420 may be examined to find one or more motion vectors (MVs) that are associated with the same reference frame index as the current block. Spatial neighboring blocks may be examined for a luma block, for example, according to block sets depicted in FIG. 4, which are labeled according to an order of examination. Namely: (1) The top adjacent row is checked from left to right. (2) The left adjacent column is checked from top to bottom. (3) The top-right neighboring block is checked. (4) The top-left block neighboring block is checked. (5) The first top non-adjacent row is checked from left to right. (6) The first left non-adjacent column is checked from top to bottom. (7) The second top non-adjacent row is checked from left to right. (8) The second left non-adjacent column is checked from top to bottom.

Candidates for "adjacent" spatial MV predictors derived from "adjacent" blocks (i.e., blocks of block sets 1-3) may be put into an MV predictor list ahead of candidates for temporal MV predictors of a temporal motion vector predictor (TMVP), which will be described further herein, and candidates for "non-adjacent" spatial MV predictors derived from "non-adjacent" blocks (also known as outer blocks, i.e., blocks of block sets 4-8) are put into the MV predictor list after the candidates for temporal MV predictors.

In an embodiment, each SMVP candidate has the same reference picture as the current block. For example, assume that the current block 410 has a single reference picture. If an MV candidate also has a single reference picture which is the same as the ref picture of the current block, this MV candidate may be put into the MV predictor list. Similarly, if an MV candidate has a plurality of reference pictures and one of the ref pictures is same as the reference picture of the current block, this MV candidate may be put into the MV predictor list. However, if the current block 410 has a plurality of reference pictures, an MV candidate may be put into the MV predictor list only when the MV candidate has, for each of those reference pictures of the current block 410, a corresponding reference picture which is the same.

Figure 5:
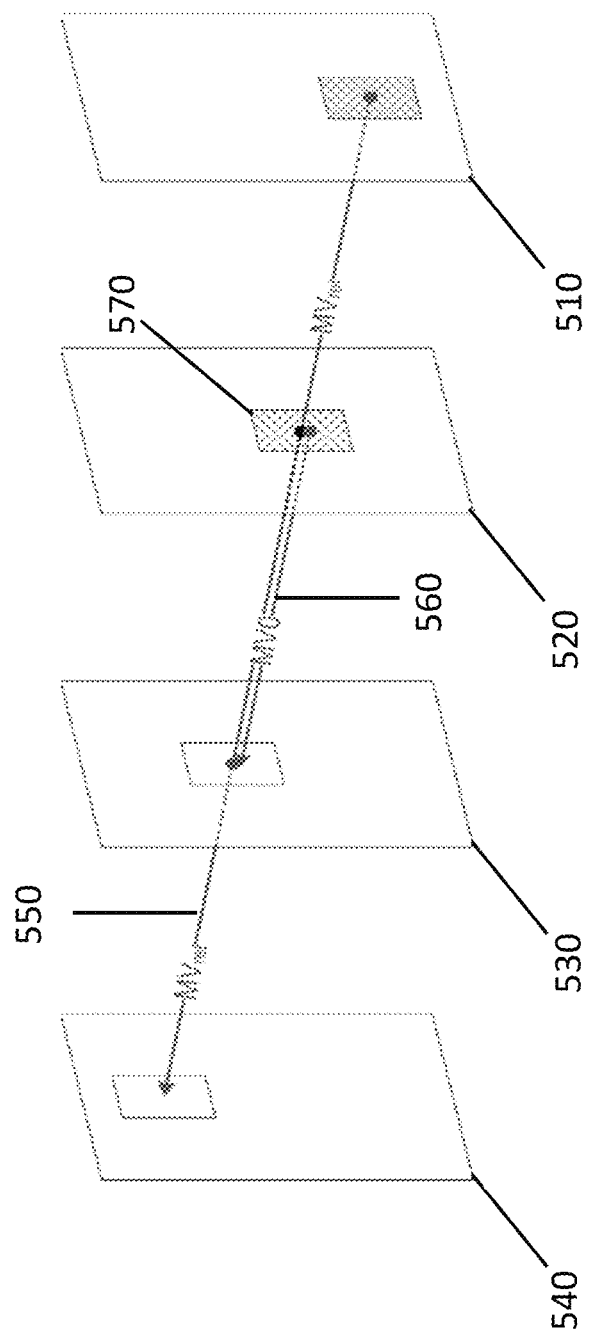
FIG. 5 depicts an illustrative operation of temporal motion vector predictors, in accordance with an exemplary embodiment.

FIG. 5 depicts an illustrative operation of a set of temporal motion vector predictors (TMVPs), in accordance with an exemplary embodiment. The TMVPs may be derived using collocated blocks in reference frames. To generate the TMVPs, first, one or more MVs of one or more reference frames may be stored with reference indices associated with the respective reference frames. Thereafter, for each 8×8 block of a current frame, the MVs of a reference frame whose trajectories pass through the 8×8 block may be identified and stored with the reference frame index in a temporal MV buffer. For inter prediction using a single reference frame, regardless of whether the reference frame is a "forward" or "backward" reference frame (that is, later or earlier in a sequence of frames than the current frame, respectively), the MVs may be stored in 8×8 units for performing the temporal motion vector prediction of a future frame. For compound inter prediction, MVs of a "forward" reference frame may be stored in 8×8 units for performing the temporal motion vector prediction of a future frame.

An exemplary embodiment for a process of generating a TMVP may follow the following operations. In this example, a reference motion vector 550 (also labeled MVref) of an initial reference frame 510 points from initial reference frame 510 to a later reference frame 540, which is itself a reference frame of initial reference frame 510. In doing so, it passes through an 8×8 block 570 (shaded in grey dots) of a current frame 520. MVref 550 may be stored in the temporal MV buffer associated with this current block 570. During the motion projection process for deriving the temporal MV predictor 500, later reference frames (e.g. frames 530 and 540) may be scanned in a predefined order. For example, using the frame labels defined by the AV1 standard, the scanning order may be: LAST_FRAME, BWDREF_FRAME, ALTREF_FRAME, ALTREF2_FRAME, and LAST2_FRAME. In an embodiment, MVs from a higher indexed reference frame (in scanning order) do not replace previously identified MVs assigned by a lower indexed reference frame (in scanning order).

Finally, given predefined block coordinates, the associated MVs stored in the temporal MV buffer may be identified and projected onto the current block 570 to derive a temporal MV predictor 560 (also labeled MV0) that points from the current block 570 to an adjacent reference frame 530.

Figure 6:
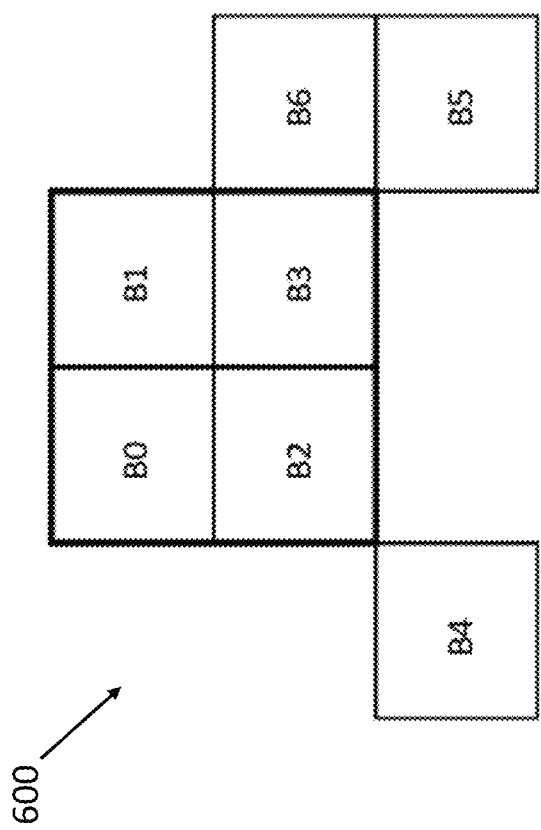
FIG. 6 depicts an illustrative set of pre-defined block positions for deriving temporal motion predictors, in accordance with an exemplary embodiment.

FIG. 6 depicts an illustrative set of pre-defined block positions 600 for deriving temporal motion predictors of a 16×16 block, in accordance with an exemplary embodiment. Up to seven blocks may be checked for valid temporal MV predictors. In FIG. 6, the blocks are labeled B0-B6. As noted with reference to FIG. 4, candidates for temporal MV predictors may be checked after the candidates for adjacent spatial MV predictors but before the candidates for non-adjacent spatial MV predictors, and placed into a first MVP list. Then, for the derivation of MV predictors (MVPs), all the spatial and temporal MVP candidates may be pooled, and each candidate may be assigned a weight that is determined during the scanning of the spatial and temporal neighboring blocks. Based on the associated weights, the candidates may be sorted and ranked, and up to four candidates may be identified and placed into a second MVP list. This second list of MVPs is also referred to as a dynamic reference list (DRL), which may be further used in dynamic MV prediction modes.

If the DRL is not full, an extra search may be performed and resulting extra MVP candidates will use to fill the DRL. The extra MVP candidates may include, for example, a global MV, a zero MV, combined compound MVs without scaling, and so forth. The adjacent SMVP candidates, TMVP candidates, and non-adjacent SMVP candidates that are in the DRL may then be reordered again. AV1 and AVM both enable reordering, for example, based on a weight of each candidate. The weight of a candidate may be predefined depending on the overlapped area of the current block and the candidate blocks.

Figure 7:
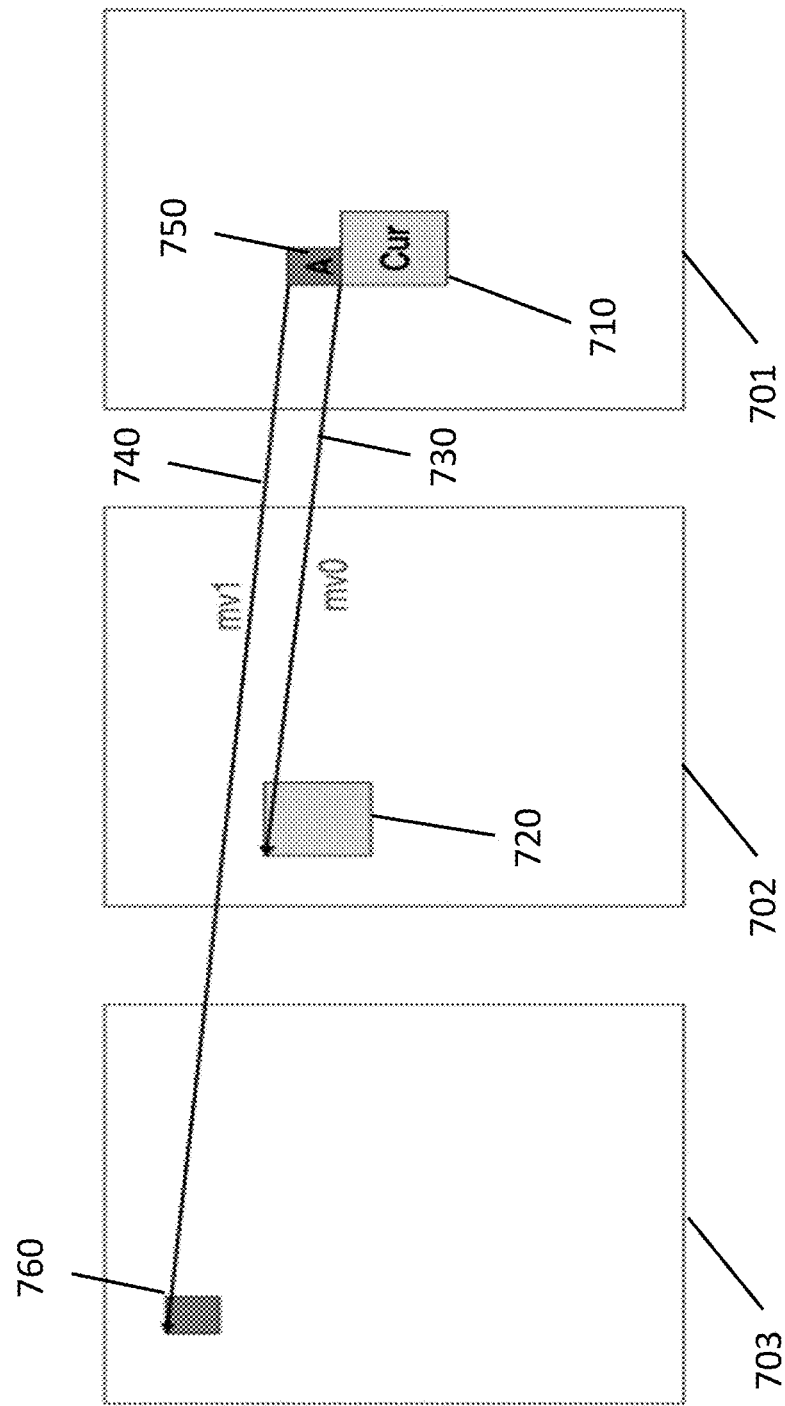
FIG. 7 depicts an illustrative operation of generating a motion vector candidate via a single inter prediction block, in accordance with an exemplary embodiment.

FIG. 7 depicts an illustrative operation of generating a new MV candidate via a single inter prediction block, in accordance with an exemplary embodiment. When a reference frame of a neighboring block is different from a reference frame of a current block, but the MVs are in the same direction, then a temporal scaling algorithm may be utilized to scale its MV to that reference frame in order to form a MVP for the motion vector of current block. In the example of FIG. 7, a motion vector 740 (also labeled mv1 in FIG. 7) from neighboring block 750 of current block 710, in a current frame 701, points to a collocated neighboring block 760 in a reference frame 703. The motion vector 740 may be utilized to derive the MVP for a motion vector 730 (also labeled mv0 in FIG. 7) of current block 710, which points to a collocated current block 720 in another reference frame 702, using temporal scaling.

Figure 8:
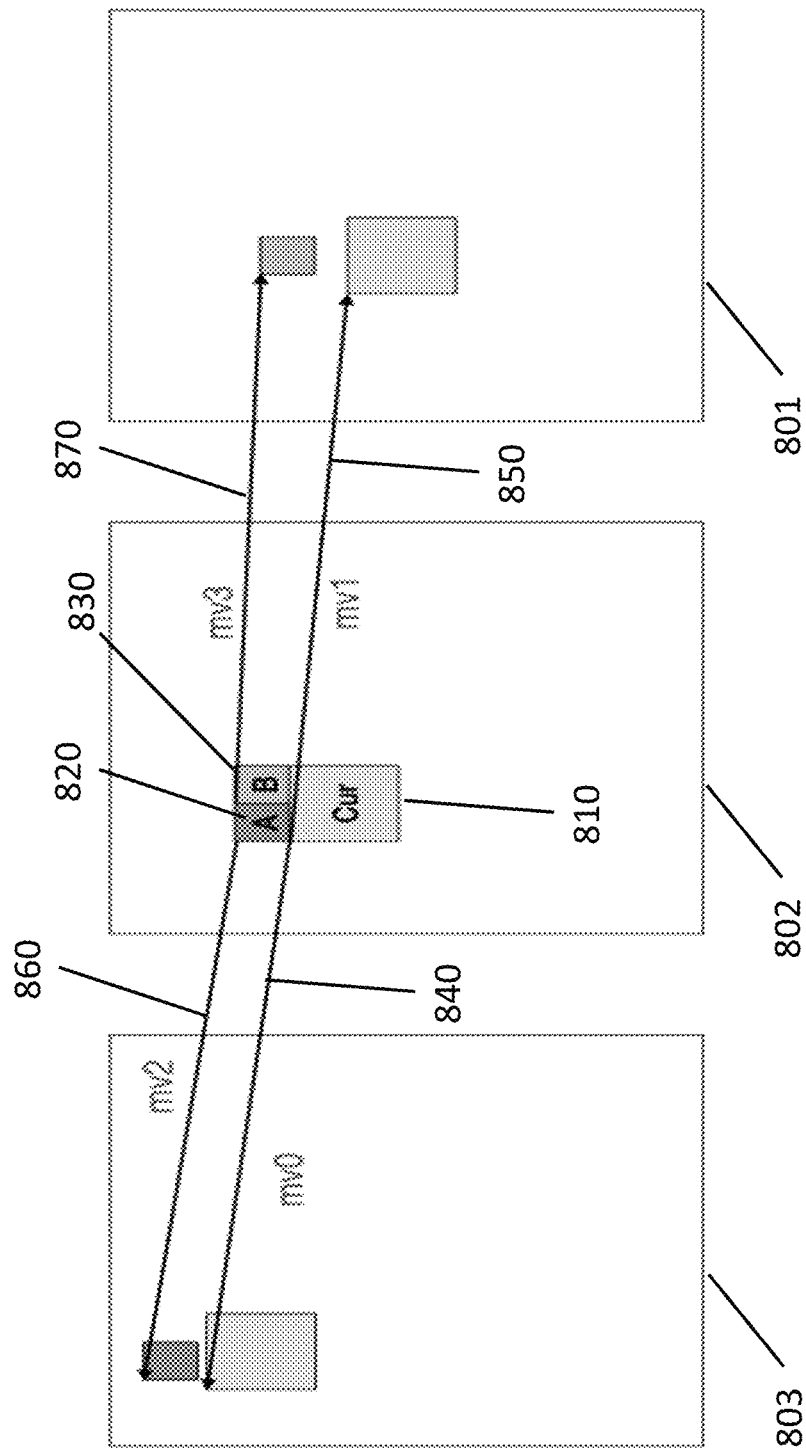
FIG. 8 depicts an illustrative operation of generating a motion vector candidate via a compound inter prediction block, in accordance with an exemplary embodiment.

FIG. 8 depicts an illustrative operation of generating a new MV candidate via a compound prediction block, in accordance with an exemplary embodiment. In the example of FIG. 8, composed MVs 860, 870 point from respective different neighboring blocks 820, 830 of a current block 810 of current frame 802, into reference frames 803 and 801. The reference frames 803 and 801 of the composed MVs 860, 870 (also labeled mv2 and mv3 in FIG. 8) may be the same as for the current block 810. A compound inter prediction may derive an MVP for composed MVs 840, 850 (also labeled mv0 and mv1 in FIG. 8) of the current block 710, which may be determined as in FIG. 7.

Figure 9:
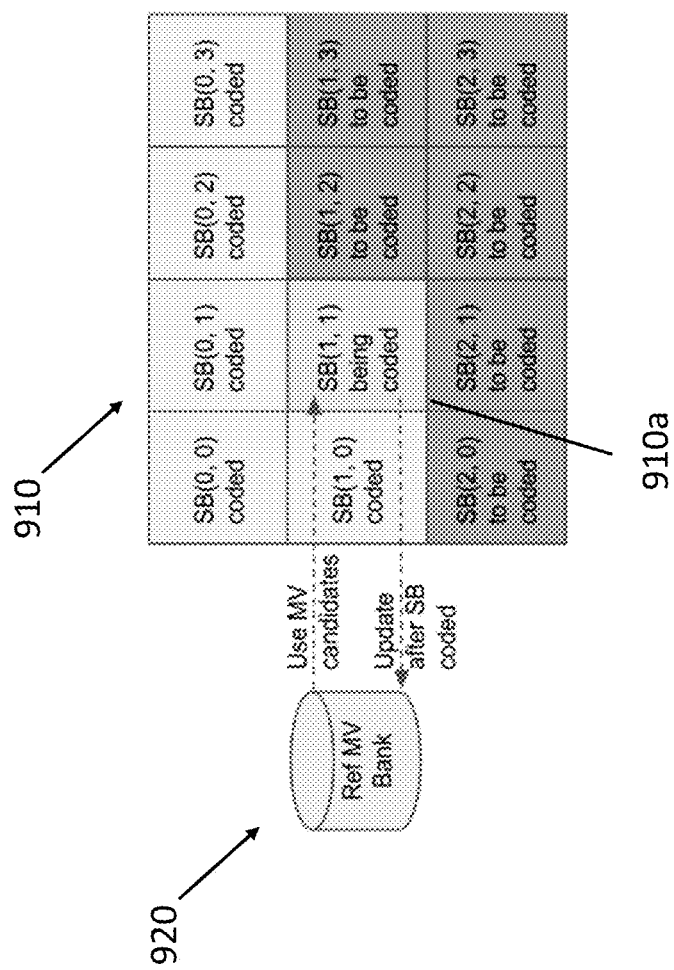
FIG. 9 depicts an illustrative operation of updating a motion vector candidate bank, in accordance with an exemplary embodiment.

FIG. 9 depicts an illustrative operation of updating a motion vector candidate bank 920, in accordance with an exemplary embodiment. This bank 920 was initially proposed in CWG-B023, which is incorporated in its entirety herein.

The bank updating process may be based on superblocks 910. That is, after each superblock (e.g. superblock 910a) is coded, a set of first candidate MVs used by each coding block inside the superblock (for example, the first 64 such candidates) may be added to the bank 920. During updating, pruning may also be involved.

After reference MV candidate scanning is complete for a superblock, if there are open slots in the candidate list, the codec may reference the MV candidate bank 920 (in the buffer with matching reference frame type) for additional MV candidates. Going from the end backwards to the start of the buffer, the MV in the bank buffer may be appended to the candidate list if it does not already exist in the list. More specifically, each buffer may correspond to a unique reference frame type, corresponding to a single or a pair of reference frames, covering single and compound inter modes respectively. All the buffers may be the same size. When a new MV is added to a buffer that is full, an existing MV may be evicted to make room for the new one.

Coding blocks may refer to the MV candidate bank 920 to collect reference MV candidates, in addition to the ones obtained with the AV1 reference MV list generation. After coding a superblock, the MV bank may be updated with the MVs used by the coding blocks of the superblock.

AV1 enables dividing frames into tiles, where each tile contains a plurality of superblocks. Each tile may be processed in parallel on different processors. With regard to candidate banks, each tile may have an independent MV candidate bank that is utilized by all superblocks within the tile. At the beginning of encoding each tile, the corresponding bank is emptied. Thereafter, while encoding each superblock within that tile, MVs from the bank may be used as MV reference candidates. After encoding each superblock, the bank may be updated as described above.

Certain embodiments of bank update and referencing processes for bank update and referencing will be described later herein.

Figure 10:
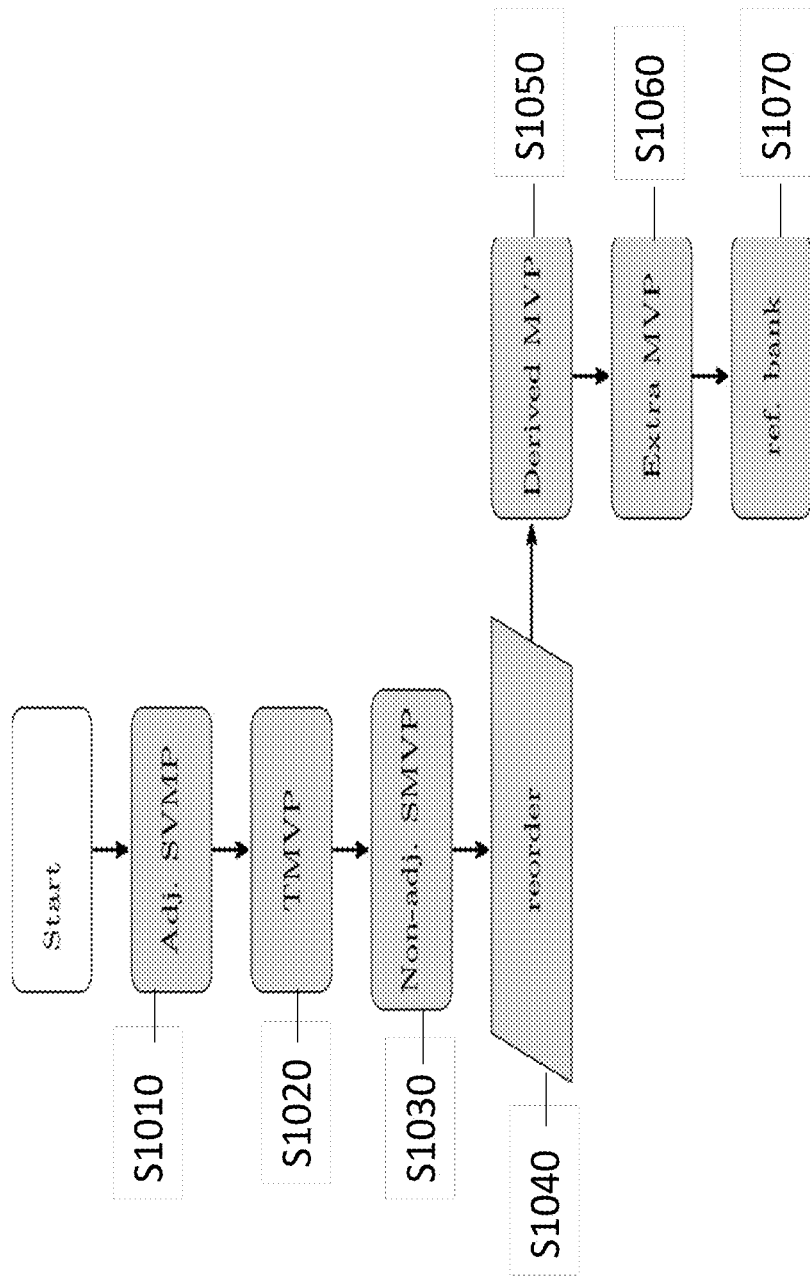
FIG. 10 is a flow diagram depicting a process of motion vector prediction list construction, in accordance with an exemplary embodiment.

FIG. 10 is a flow diagram depicting a process of motion vector prediction list construction for an arbitrary video input, in accordance with an exemplary embodiment. The adjacent SMVP, the TMVP, and the non-adjacent SMVP candidates may be generated at S1010, S1020, and S1030, respectively, for example by the processes earlier discussed with reference to FIGS. 4 and 5. Next the candidates may be sorted or otherwise reordered at S1040, for example by the processes earlier discussed with reference to FIG. 6. Further MVP candidates may be derived at S1050, for example by the processes earlier discussed with reference to FIGS. 7 and 8. If needed, extra MVP candidates may be determined by extra search at S1060, for example by the processes earlier discussed with reference to FIG. 6, or retrieved from a reference bank at S1070, for example by the processes earlier discussed with reference to FIG. 9.

Figure 11:
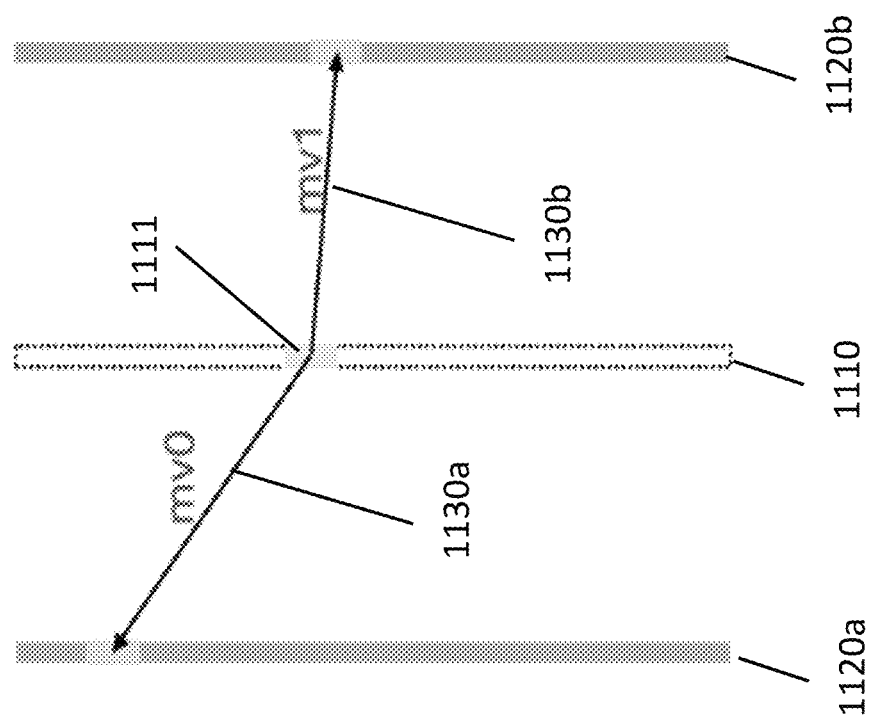
FIG. 11 depicts an illustrative operation of a compound inter prediction mode, in accordance with an exemplary embodiment.

FIG. 11 depicts an illustrative operation of a compound inter prediction mode, in accordance with an exemplary embodiment.

Compound inter modes may create a prediction of a block by combining hypotheses from a plurality of different reference frames. In the example of FIG. 11, for example, a block 1111 of current frame 1110 is predicted by motion vectors 1130a, 1130b (also labeled mv0, mv1 in FIG. 11) of neighboring references frames 1120a, 1120b. Neighboring references frames 1120a, 1120b may be immediate neighbors (that is, the frames immediately preceding and following current frame 1110 in a sequence), although this is not a requirement. Motion information components for each block (e.g., motion vectors 1130a, 1130b) may be sent in the bitstream as overhead.

However, although motion vectors may be usually well predicted using predictors from the spatial and temporal neighbors or the historical motion vectors, the bytes used for motion information may still be quite significant for a lot of content and applications.

Figure 12:
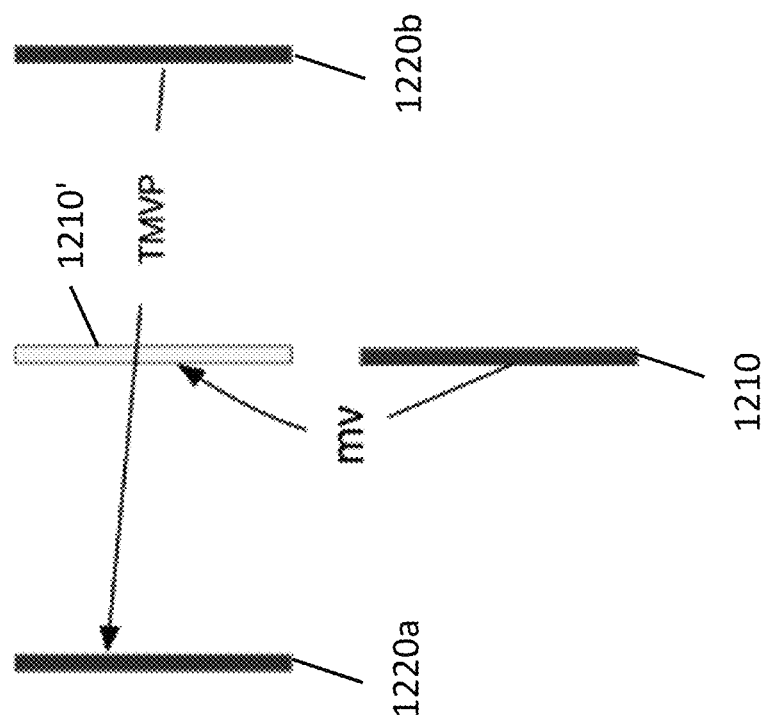
FIG. 12 depicts an illustrative operation of a temporal interpolated prediction mode, in accordance with an exemplary embodiment.

FIG. 12 depicts an illustrative operation of a temporal interpolated prediction (TIP) mode, in accordance with an exemplary embodiment.

In the example of FIG. 12, information in reference frames 1220a, 1220b will be combined and projected to the same time instance as a current frame 1210 using a simple interpolation process. Multiple TIP modes may be supported. In one TIP mode, an interpolated frame or "TIP frame" 1210' may be used as an additional reference frame. A coding block of the current frame 1210 may directly reference the TIP frame 1210' and utilize the information coming from two different references with only the overhead cost of a single inter prediction mode. In another TIP mode, the TIP frame 1210' may be directly assigned as the output of the decoding process for the current frame 1210 while skipping any other traditional coding steps. This mode may provide considerable coding and simplification benefits, especially for low-bitrate applications.

Although there are existing techniques to interpolate a frame between two reference frames, such as Frame Rate Up Conversion (FRUC), achieving a good tradeoff between complexity and compression quality may be a crucial constraint when designing new coding tools. The method disclosed above is simple, and re-uses already available motion information in the reference frames, without a need to perform any additional motion search. Simulation results show that this simple method may achieve good quality with a low-complexity implementation.

In the example of FIG. 12, a TIP mode operation begins by generating a TIP frame 1210' corresponding to the current frame 1210. The TIP frame 1210' may then be used as either an additional reference frame for the current frame 1210, or be directly assigned as a reconstructed output of a decoder for the current frame 1210. At the decoder side, the blocks coded in a TIP mode may be generated on-the-fly, such that it is not necessary to create the whole TIP frame 1210' at the decoder, conserving decoding time and processing. Such is also compatible with the one pass decoding pipeline at decoder, which is good for hardware implementation.

The frame level TIP mode may be indicated using a syntax element. Examples of modes, indicated by values for a tip_frame_mode parameter, are shown in the following table.

TABLE 1

Example tip modes

| tip_frame_mode | Meaning |
| --- | --- |
| 0 | Disable TIP mode in this frame |
| 1 | Use TIP frame as an additional reference frame, normally coding current frame |
| 2 | Directly output TIP frame, no coding of the current frame |

A simple interpolation method for interpolating an intermediate frame between two frames is disclosed, which may fully re-use the motion vectors from the available references. The same motion vectors may also be used for the temporal motion vector predictor (TMVP) process after minor modification. This process may include three operations: 1. Create a coarse motion vector field for the TIP frame through projection of the modified TMVP field. 2. Refine the coarse motion vector field by filling holes and using smoothing operations. 3. Generate the TIP frame using the refined motion vector field. At the decoder side, the blocks coded with TIP mode may be generated on-the-fly without creating the whole TIP frame.

However, it is noted that other suitable interpolation methods may be substituted, in combination with other features discussed in this disclosure, and such is within the scope of the disclosure.

Figure 13:
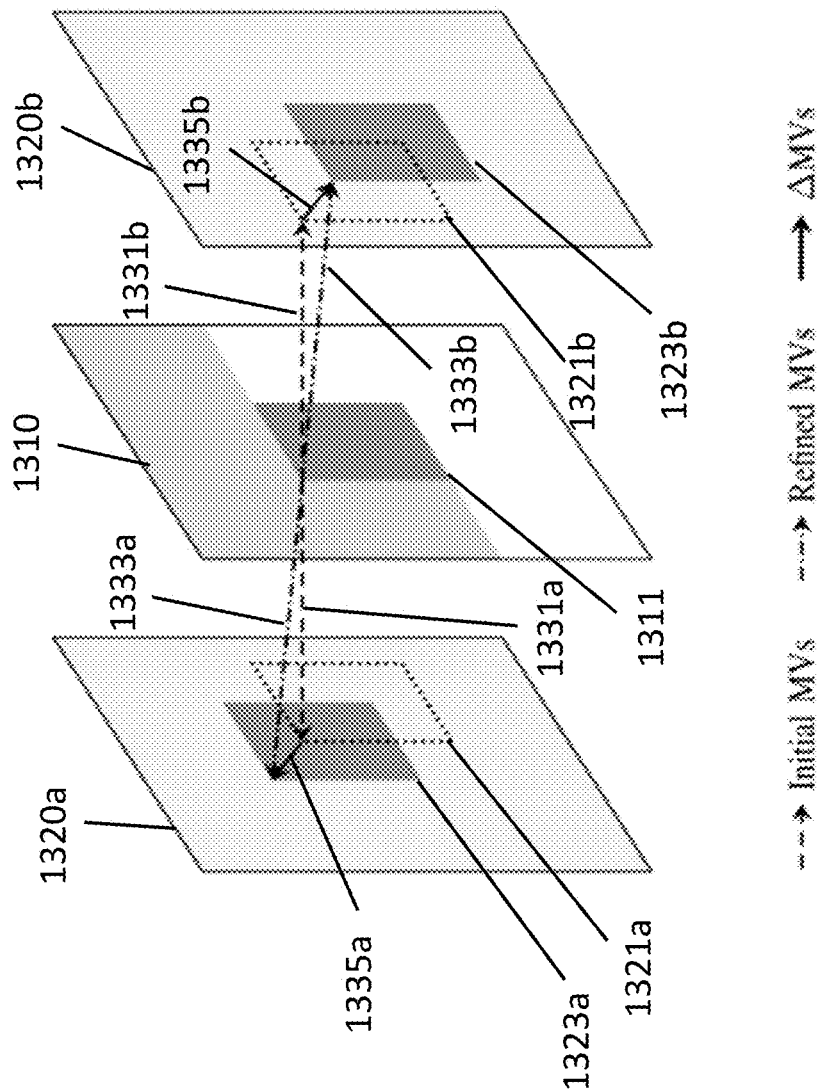
FIG. 13 depicts an illustrative operation of a bilateral matching-based decoder-side motion vector refinement, in accordance with an exemplary embodiment.

FIG. 13 depicts an illustrative operation of a bilateral matching-based decoder-side motion vector refinement, in accordance with an exemplary embodiment. Versatile Video Coding (VVC) may distribute the previously decoded pictures into two reference picture lists 1320a, 1320b. These previously decoded pictures may be used as references to predict a current picture 1310. In the example of FIG. 13, reference pictures prior to the current picture 1310, according to a display order, may be assigned to a "past" reference picture list 1320a, whereas reference pictures later than the current picture 1320 may be assigned to a "future" reference picture list 1320b. Corresponding reference picture indices for each list (not depicted) indicate which picture in each list is used to predict a current block 1311 of the current picture 1310. For the bidirectional prediction case, two prediction blocks 1321a and 1321b, which are predicted using respective MVs 1331a, 1331b for past reference picture list 1320a and future reference picture list 1320b, may be combined to obtain a single prediction signal.

If the motion information is coded by the merge mode, the reference picture indices and the MVs of the neighboring blocks may be directly applied to the current block 1311. However, this might not precisely predict the current block 1311.

A decoder-side motion vector refinement (DMVR) algorithm may be used to increase the precision of the merge-mode-coded blocks, by only involving decoder-side information. When a DMVR algorithm is applied to blocks 1311, 1321a, and 1321b, the MVs 1331a, 1331b derived from the merge mode may be set as the "initial" MVs for DMVR.

DMVR may then further refine the initial MVs 1331a, 1331b by block matching. In both reference pictures, candidate blocks surrounding the initial MV-pointed blocks 1321a, 1321b may be searched to perform a bilateral match. The best-matched blocks 1323a, 1323b may be used to generate the final predicted signal, and new MVs 1333a, 1333b, which point to these new prediction blocks 1323a, 1323b, may be set as "refined" MVs respectively corresponding to the initial MVs 1331a, 1331b. Many block matching methods suitable for DMVR have been studied, such as template matching, the bidirectional template matching-based method, and the bilateral matching-based method adopted in VVC.

In bilateral matching-based DMVR, the block pair 1321a, 1321b pointed to by the initial MVs may be defined as an initial block pair. The distortion cost of initial block pair 1321a, 1321b may be calculated as the initial cost. The blocks surrounding the initial block pair 1321a, 1321b may be used as the DMVR candidate block pairs. Each block pair may include one predicted block from a reference picture in past reference picture list 1320a and one predicted block from a reference picture in future reference picture list 1320b.

Distortion costs of the DMVR candidate block pairs may be measured and compared. Because a DMVR candidate block pair with the lowest distortion cost comprises the two most similar blocks between the reference pictures, this block pair (i.e. blocks 1323a, 1323b) may be assumed to be the best predictor of the current block 1311. Thus, block pair 1323a, 1323b may be used to generate the final bi-predicted signal. The corresponding MVs 1333a, 1333b may be denoted as refined MVs. If all DMVR candidate block pairs have larger distortion costs than the initial block pair 1321a, 1321b, the initial blocks 1321a, 1321b may be used for bi-prediction, and the refined MVs 1333a, 1333b may be set equal to the initial MVs 1331a, 1331b.

To simplify the distortion cost computation, the sum of absolute difference (SAD) may be used as the distortion metric, and may consider only the luma distortion in the DMVR search process. Note that the SAD may be evaluated between the even rows of the candidate block pair to further reduce the computational complexity.

In the example of FIG. 13, the dotted blocks (1321a, 1321b) in each reference picture indicate the initial block pair. The gray blocks (1323a, 1323b) indicate the best-matched block pair, which may be the block pair with the lowest SAD cost compared with the other DMVR candidate block pairs and the initial block pair 1321a, 1321b. The initial MVs 1331a, 1331b may be refined to generate refined MVs 1333a, 1333b, and the final bi-predicted signal may be generated using the best-matched block pair 1323a, 1323b. Note that the initial MVs 1331a, 1331b do not have to point to a full-sample position, because it may be derived from a merge mode and up to $\frac{1}{16}$ fractional-sample MV precision may be thereby supported.

Because a difference between a refined MV and a corresponding initial MV (indicated in FIG. 13 as ΔMVs 1335a, 1335b) may be an integer or fractional, the refined MV may point to a fractional pixel position. In this case, the intermediate searched blocks and final predicted blocks may be generated by the DMVR interpolation process.

In some embodiments, the block level bilateral matching-based DMVR may be performed on top of a TMVP generated motion field. An example such process is now described, making reference to concepts previously described herein.

The process may begin with the motion field being generated as part of the TIP for each 8×8 block. A motion field is a representation of three-dimensional motion as projected onto a two-dimensional space, such as a picture, and is typically defined by one or more motion vectors each describing the movement of a corresponding point. Here, the motion field may contain two motion vectors (MV0 and MV1) pointing to two reference pictures. The motion vectors (MV0 and MV1) may be used as the starting point of the DMVR process. More specifically, the corresponding predictors in the reference pictures that are pointed to by the motion vectors may be generated. In this operation, filters, such as interpolation, bilinear, etc. may be used to filter the inputs. After, candidate predictors surrounding the motion vectors may be generated. These predictors may be searched through a predefined search range N, which is an integer value corresponding to the number of luma samples. The search precision is defined as K, which may be a fractional number from ¹⁄₁₆, ⅛, ¼, ½, 1, 2, 4, 8 to the number of luma samples (up to the highest supported MV precision). In the next operation, bilateral matching between all the candidate predictors may be performed, and the position of the predictors that contains the lowest distortion cost may be determined to be the refined position for this 8×8 block. The distortion cost may be, but is not limited to, SAD, SATD, SSE, subsampled SAD, mean-removed SAD, etc.

After the refined position (the refined motion vector) for each 8×8 block is obtained, the TIP process may be performed. More specifically, the TIP frame may be generated using the DMVR refined motion vector field. The generated frame may be used as a reference for the prediction, or may be directly used as the prediction.

At the decoder side, when a block is coded as a TIP or by the TIP mode, the TIP predictors and the DMVR refinement may be performed on the fly without generating the whole frame. In some embodiments, sub-block level bilateral matching-based DMVR may be performed on top of the TMVP generated motion field. More specifically, for each 8×8 TIP block set, an additional split may be performed. Such an additional split may result in 4 4×4 sub-blocks from each 8×8 block. Each sub-block may perform a bilateral matching-based DMVR search to obtain the refined motion field for TIP. Additionally, the sub-block level bilateral matching based DMVR may be performed on top of the TMVP generated motion field and the optical flow refinement. More specifically, for each 8×8 TIP blocks, a further split may be performed. For example, each 8×8 TIP block may be split into four 4×4 sub-blocks, where optical flow refinement is firstly applied to refine the motion vector, then bilateral matching-based DMVR search is further applied refine the motion field for TIP.

In some embodiments, sub-block level bilateral matching based DMVR may be performed on top of TMVP generated motion field and optical flow refinement. For example, for each 8×8 TIP block, an additional split operation may generate four 4×4 sub-blocks, and bilateral matching-based DMVR refinement is applied to refine the motion vector, then optical flow refinement is further applied to refine the motion filed for TIP. In some embodiments, multi-stage DMVR may be used to refine the TMVP generated TIP motion field. For example, a first block-level DMVR may be used to refine the initial motion field that is generated. The refined MVs may be used as starting point of the second stage. In the second stage, the sub-block level DMVR may be performed to further refine the motion field. Additional such stages are within the scope of the disclosure.

In other embodiments, the TIP motion field may use explicitly signaled MV differences and/or corrections. Starting from an arbitrary level, for example, a group of coding blocks, a coding block or a sub-block level, one or more motion vector differences (MVDs) may be signaled into the bitstream. The bitstream may be parsed by the decoder and used as a correction of the TIP motion field. If a block is encoded as TIP mode, the corresponding motion field for the block may be generated using the TMVP-based method. Next, a parsed MVD may be added to the motion field, such that, if the block is 8×8 or smaller, the MV of the block may be corrected by the parsed MVD. If the block is larger than 8×8, each MV of each 8×8 sub-block may be added to the parsed MVD.

In some embodiments, when TIP is applied using two reference pictures for motion compensation, MVDs may be signaled to correct the motion filed associated with selected reference pictures. For example, MVD may be signaled for a future reference picture list but not signaled for a past reference picture list, or vice versa. A selection of which reference picture requires further MVDs signaled may be further signaled or implicitly derived.

Figure 14:
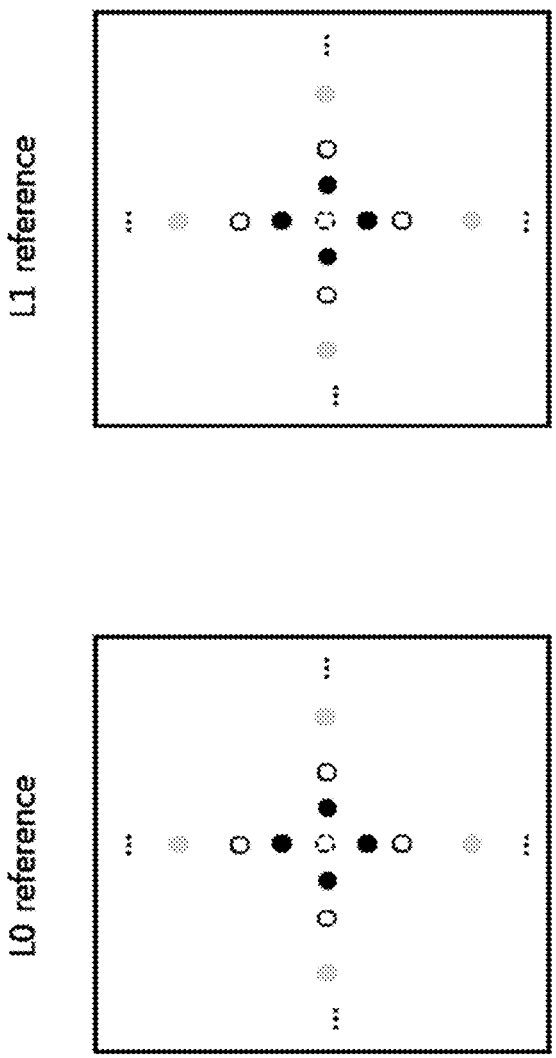
FIG. 14 depicts an illustrative use case of a merge mode with motion vector difference, in accordance with an exemplary embodiment.

FIG. 14 depicts an illustrative use case of a merge mode with motion vector difference (MMVD), in accordance with an exemplary embodiment. Merge mode may be typically used with implicitly derived motion information to predict samples generated by the current coding unit (CU). The merge mode with motion vector differences may use a flag to signal that MMVD is used for the CU. The MMVD flag may be sent after a skip flag is sent. In MMVD, after a merge candidate is selected, it may be further refined by the signalled MVD information. The further information may include a merge candidate flag, an index to specify motion magnitude, and an index for indication of motion direction. In MMVD mode, one of the first two candidates in the merge list may be selected for use as an MV basis. The merge candidate flag may signal which candidate is to be used.

This operation may use a distance index that specifies motion magnitude information and indicates the pre-defined offset from the starting point. An offset may be added to either horizontal component or vertical component of starting MV. An example relationship of distance index and pre-defined offset is specified in Table 2.

TABLE 2

Relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

A direction index may represent the direction of the MVD relative to the starting point. The direction index may represent one of four directions, as shown in Table 3:

TABLE 3

| Sign of MV offset specified by direction index | | | | |
|---|---|---|---|---|
| Direction IDX | 00 | 01 | 10 | 11 |
| x-axis | + | − | N/A | N/A |
| y-axis | N/A | N/A | + | − |

The meaning of the MVD sign may be variant according to the information of the starting MVs. When the starting MVs are uni-prediction MVs, or bi-prediction MVs with both reference picture lists pointing to the same side of the current picture (i.e. the picture order counts (POCs) of two references are both larger than the POC of the current picture, or are both smaller than the POC of the current picture), the sign in Table 3 may specify the sign of the MV offset added to the starting MV. When the starting MVs is bi-prediction MVs with the two MVs pointing to the different sides of the current picture (i.e. the POC of one reference is larger than the POC of the current picture, and the POC of the other reference is smaller than the POC of the current picture), and the difference of POC in a first reference picture list is greater than in a second, the sign in Table 3 may specify the sign of MV offset added to the first list MV component for a starting MV and the sign for the second list MV may have the opposite value. Otherwise, if the difference of POC in the second list is greater than in the first list, the sign in Table 3 may specify the sign of MV offset added to the second list MV component for a starting MV, and the sign for the first list MV may have the opposite value.

The MVD may be scaled according to the difference of POCs in each direction. If the differences of POCs in both lists are the same, scaling may be omitted. Otherwise, if the difference of POC in one list is larger than in the other, the MVD for the list with the smaller POC difference may be scaled. If the starting MV is uni-predicted, the MVD may be added to the available MV.

In addition to unidirectional prediction and bi-directional prediction mode MVD signalling, symmetric MVD mode for bi-directional MVD signalling may also be applied. In the symmetric MVD mode, motion information including reference picture indices of both reference picture lists and an MVD of a future reference picture list are not signaled but derived.

In a specific implementation, a decoding process of the symmetric MVD mode may be as follows.

At slice level, variables BiDirPredFlag, RefIdxSymL0 and RefIdxSymL1 may be derived as follows: If mvd_l1_zero_flag is 1, BiDirPredFlag is set equal to 0. Otherwise, if the nearest reference picture in a past reference picture list L0 and the nearest reference picture in a future reference picture list L1 form a forward and backward pair of reference pictures or a backward and forward pair of reference pictures, BiDirPredFlag is set to 1, and both L0 and L1 reference pictures are short-term reference pictures. Otherwise, BiDirPredFlag is set to 0.

At CU level, a symmetrical mode flag indicating whether symmetrical mode is used or not may be explicitly signaled if the CU is bi-prediction coded and BiDirPredFlag is equal to 1. When the symmetrical mode flag is true, mvp_l0_flag, mvp_l1_flag and MVD0 may be explicitly signaled, and other signals may be omitted. The reference indices for L0 and L1 may be set equal to the pair of reference pictures, respectively, and MVD1 may be set equal to (−MVD0).

In some embodiments, for each coded block in inter frame, if the mode of current block is not skip mode but inter-coded mode, then another flag may be signaled to indicate whether single reference mode or compound reference mode is used to current block. A prediction block may be generated by one motion vector in single reference mode, and may be generated by weighted averaging two prediction blocks derived from two motion vectors in compound reference mode.

For single reference mode, the following specific modes may be signaled according to syntaxes of an example implementation:

NEARMV—use one of the motion vector predictors (MVP) in the list indicated by a DRL (Dynamic Reference List) index NEWMV—use one of the motion vector predictors (MVP) in the list signaled by a DRL index as reference and apply a delta to the MVP.

GLOBALMV—use a motion vector based on frame-level global motion parameters

For compound reference modes, the following specific modes may be signaled according to syntaxes of an example implementation:

NEAR_NEARMV—use one of the motion vector predictors (MVP) in the list signaled by a DRL index.

NEAR_NEWMV—use one of the motion vector predictors (MVP) in the list signaled by a DRL index as reference and send a delta MV for the second MV.

NEW_NEARMV—use one of the motion vector predictors (MVP) in the list signaled by a DRL index as reference and send a delta MV for the first MV.

NEW_NEWMV—use one of the motion vector predictors (MVP) in the list signaled by a DRL index as reference and send a delta MV for both MVs.

GLOBAL_GLOBALMV—use MVs from each reference based on their frame-level global motion parameters In some embodiments, the operation may allow for ⅛ pixel motion vector precision (or accuracy), and the following syntaxes may be used to signal the motion vector difference in L0 or L1 in an example implementation:

mv_joint specifies which components of the motion vector difference are non-zero.

0 indicates there is no non-zero MVD along either horizontal or vertical direction.

1 indicates there is non-zero MVD only along horizontal direction.

2 indicates there is non-zero MVD only along vertical direction.

3 indicates there is non-zero MVD along both horizontal and vertical direction.

mv_sign specifies whether motion vector difference is positive or negative.

mv_class specifies the class of the motion vector difference. As shown in Table 4, a higher class may indicate that the motion vector difference has a larger magnitude:

TABLE 4

| Magnitude class for motion vector difference | |
|---|---|
| MV class | Magnitude of MVD |
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |

TABLE 4-continued

Magnitude class for motion vector difference

| MV class | Magnitude of MVD |
|---|---|
| MV_CLASS_7 | (128, 256] |
| MV_CLASS_8 | (256, 512] |
| MV_CLASS_9 | (512, 1024] |
| MV_CLASS_10 | (1024, 2048] | mv_bit specifies the integer part of the offset between motion vector difference and starting magnitude of each MV class.

mv_fr specifies the first 2 fractional bits of the motion vector difference.

mv_hp specifies the third fractional bit of the motion vector difference.

For NEW_NEARMV and NEAR_NEWMV mode, the precision of the MVD may depend on the associated class and the magnitude of MVD. For example, fractional MVD may be allowed only if MVD magnitude is equal to or less than one-pixel. Additionally, only one MVD value may be allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5).

The allowed MVD values in each MV class, according to the above embodiment, are illustrated in Table 5.

TABLE 5

Adaptive MVD in each MV magnitude class

| MV class | Magnitude of MVD |
|---|---|
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In addition, if a current block is coded as NEW_NEARMV or NEAR_NEWMV mode, one context may be used for signaling mv_joint or mv_class. Otherwise, another context may be used for signaling mv_joint or mv_class.

A new inter coded mode, named as JOINT_NEWMV, may be applied to indicate whether the MVDs for two reference lists are jointly signaled. If the inter prediction mode is equal to JOINT_NEWMV mode, MVDs for L0 and L1 may be jointly signaled. More specifically, only one MVD, named as joint_mvd, may be signaled and transmitted to the decoder, and the delta MVs for L0 and L1 may be derived from joint_mvd.

JOINT_NEWMV mode may be signaled together with NEAR_NEARMV, NEAR_NEWMV, NEW_NEARMV, NEW_NEWMV, and GLOBAL_GLOBALMV mode. No additional contexts need be added. When JOINT_NEWMV mode is signaled, and the POC distance between two reference frames and current frame is different, MVD may be scaled for L0 or L1 based on the POC distance. Let td0 be a POC distance between L0 and a current frame, and let td1 be a POC distance between L1 and the current frame. If td0 is equal to or larger than td1, joint_mvd may be directly used for L0 and the mvd for L1 may be derived from joint_mvd based on the equation (1):

$$\text{derived\_mvd} = \frac{td1}{td0} * \text{joint\_mvd} \quad (1)$$

Otherwise, if td1 is equal to or larger than td0, joint_mvd may be directly used for L1 and the mvd for L0 may be derived from joint_mvd based on the equation (2):

$$\text{derived\_mvd} = \frac{td0}{td1} * \text{joint\_mvd} \quad (2)$$

(It will be apparent that, if td0 and td1 are equal, according to either of the above equations, derived_mvd=joint_mvd; as such, joint_mvd may be directly used as the derived MVD for both L0 and L1, in which case no scaling will occur.)

An inter coded mode, named here as AMVDMV mode, may be made available for a single reference case. In AMVDMV mode, adaptive MVD (AMVD) resolution is applied to a signal MVD.

A flag (labeled here as amvd_flag) may be added under JOINT_NEWMV mode to indicate whether AMVD is applied to a joint MVD coding mode; this may be termed a joint AMVD coding. In a joint AMVD coding, MVDs for two reference frames may be jointly signaled and the precision of MVD may be implicitly determined by MVD magnitudes. Otherwise, MVD for two (or more than two) reference frames may be jointly signaled, and MVD coding may be applied.

An adaptive motion vector resolution (AMVR), initially proposed in CWG-C012, which is incorporated in its entirety herein, supports seven MV precision values (8, 4, 2, 1, ½, ¼, ⅛). For each prediction block, an adaptive motion vector (AVM) encoder may search all the supported precision values and may signal the best precision to the decoder.

To reduce the encoder run-time, two precision sets may be supported. Each precision set may contain four predefined precisions. The precision set may be adaptively selected at the frame level based on a value of maximum precision of the frame. As with standard AV1, the maximum precision may be signaled in the frame header. The following table summarizes supported precision values according to the frame level maximum precision.

TABLE 6

Supported MV precisions in two sets

| Frame level maximum precision | Supported MV precisions |
|---|---|
| ⅛ | ⅛, ½, 1, 4 |
| ¼ | ¼, 1, 4, 8 |

The AOMedia AVM repository, which is related to AV1, provides a frame level flag to indicate if the MVs of the frame contains sub-pel precisions or not. In certain embodiments, AMVR may be enabled only if the value of cur_frame_force_integer_mv flag is 0. If precision of the block is lower than the maximum precision, motion models and interpolation filters may remain un-signaled and unactuated. If the precision of a block is lower than the maximum precision, the applicable motion model may be inferred as a translation motion model, and the applicable interpolation filter may be inferred as a "regular" filter. If the precision of the block is either 4-pel or 8-pel, an inter-intra mode may remain un-signaled and may be inferred to be 0.

Figure 15:
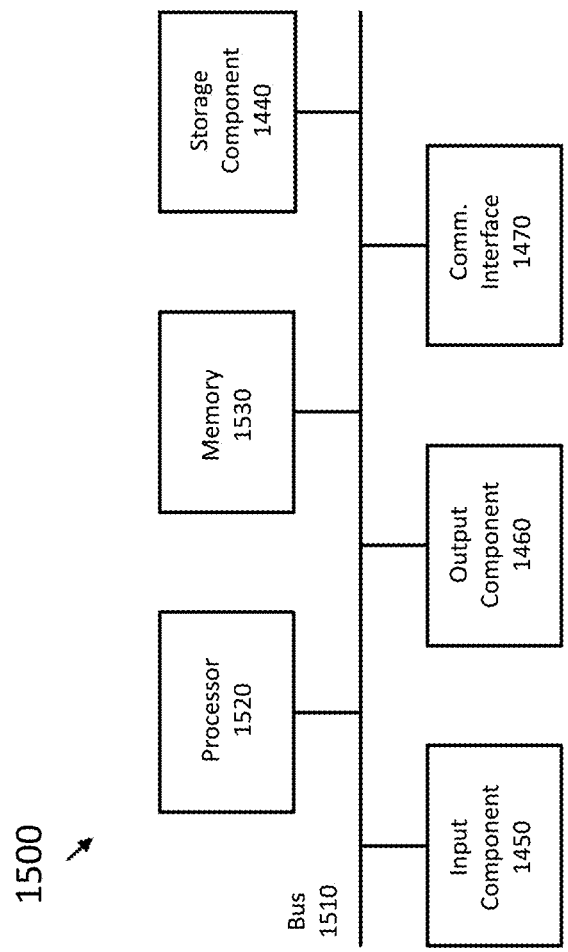
FIG. 15 is a diagram of example components of a device on which embodiments of the systems and/or methods described herein may be implemented.

FIG. 15 is a diagram of example components of a device or system 1500 on which embodiments of the systems and/or methods described herein may be implemented. The exemplary system 1500, may be one of a variety of systems such as a personal computer, a mobile device, a cluster of computers, a server, embedded device, ASIC, microcontroller, or any other device capable of running code. Bus 1510 connects the exemplary system 1500 together such that all the components may communication with one another. The bus 1510 connects the processor 1520, the memory 1530, the storage component 1540, the input component 1550, the output component 1560 and the interface component.

The processor 1520 may be a single processor, a processor with multiple processors inside, a cluster (more than one) of processors, and/or a distributed processing. The processor carries out the instructions stored in both the memory 1530 and the storage component 1540. The processor 1520 operates the computational device, carrying out operations for modifying the shared Unreal Engine Derived Data Cache. Memory 1530 is fast storage and retrieval to any of the memory devices may be enabled through the use of cache memory, which may be closely associated with one or more CPU. Storage component 1540 may be one of any longer term storage such as a HDD, SSD, magnetic tape or any other long term storage format.

Input component 1550 may be any file type or signal from a user interface component such as a camera, a handheld controller, a game pad, a keyboard, a mouse or input capturing equipment, such as motion capture equipment. Output component 1560 outputs the processed information to the communication interface 1570. The communication interface may be a speaker or other communication device, such as a screen, which may display information to a user or a another observer such as another computing system.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for video decoding in a decoder, the method comprising:
   receiving a coded video bitstream including a current picture that includes at least one block and a syntax element indicating that the at least one block is to be predicted in a temporal interpolated prediction (TIP) mode;
   generating, for the at least one block, a motion field that includes a first motion vector that points to a first reference picture and a second motion vector that points to a second reference picture;
   generating a first refined motion vector and a second refined motion vector by using the first motion vector and the second motion vector in a decoder-side motion vector refinement (DMVR) process for the at least one block, based on a bilateral matching process; and
   decoding the at least one block using the first refined motion vector and the second refined motion vector,
   wherein the bilateral matching process determines a first set of candidate motion vectors surrounding the first motion vector and a second set of candidate motion vectors surrounding the second motion vector,
   wherein the first refined motion vector is a candidate motion vector from the first set of candidate motion vectors that has a lowest distortion cost with respect to the first motion vector, and
   wherein the second refined motion vector is a candidate motion vector from the second set of candidate motion vectors that has a lowest distortion cost with respect to the second motion vector.

2. The method according to claim 1, wherein at least one candidate motion vector is determined based on a search range N, wherein N is an integer value corresponding to a number of luma samples.

3. The method according to claim 1, wherein at least one candidate motion vector is determined based on a search precision K.

4. The method according to claim 3, wherein the search precision K is one of a fractional value of a number of luma samples and an integer value corresponding to a number of luma samples.

5. The method according to claim 1, wherein the generating of the first refined motion vector and the second refined motion vector includes:
   splitting the at least one block into a plurality of sub-blocks, and
   performing the DMVR process on each sub-block of the plurality of sub-blocks.

6. The method according to claim 5, wherein the generating of the first refined motion vector and the second refined motion vector further includes at least one of:
   for each sub-block of the plurality of sub-blocks, performing an optical flow refinement process on the sub-block before the DMVR process is performed on the sub-block, and
   for each sub-block of the plurality of sub-blocks, performing an optical flow refinement process on the sub-block after the DMVR process is performed on the sub-block.

7. The method according to claim 5, wherein the generating of the first refined motion vector and the second refined motion vector includes: performing the DMVR process on the at least one block, splitting the at least one block into a plurality of sub-blocks after the DMVR process is performed on the at least one block; and performing the DMVR process on each sub-block in the plurality of sub-blocks.

8. A method of video encoding, the method comprising:
   receiving a video data including a current picture; and
   encoding the video data such that the encoded video data includes at least one block and a syntax element indicating that the at least one block is to be predicted in a temporal interpolated prediction (TIP) mode, wherein
   the encoded video data corresponds to, for the at least one block, a motion field is to be generated that includes a first motion vector that points to a first reference picture and a second motion vector that points to a second reference picture;
   the encoded video data further corresponds to a first refined motion vector and a second refined motion vector to be generated by using the first motion vector and the second motion vector in a decoder-side motion vector refinement (DMVR) process for the at least one block, based on a bilateral matching process; and wherein the bilateral matching process determines a first set of candidate motion vectors surrounding the first motion vector and a second set of candidate motion vectors surrounding the second motion vector, wherein the first refined motion vector is a candidate motion vector from the first set of candidate motion vectors that has a lowest distortion cost with respect to the first motion vector, and wherein the second refined motion vector is a candidate motion vector from the second set of candidate motion vectors that has a lowest distortion cost with respect to the second motion vector.

9. The method according to claim 8, wherein at least one candidate motion vector is determined based on a search range N, wherein N is an integer value corresponding to a number of luma samples.

10. The method according to claim 8, wherein at least one candidate motion vector is determined based on a search precision K.

11. The method according to claim 10, wherein the search precision K is one of a fractional value of a number of luma samples and an integer value corresponding to a number of luma samples.

12. The method according to claim 8, wherein generating of the first refined motion vector and the second refined motion vector includes:
   splitting the at least one block into a plurality of sub-blocks, and
   performing the DMVR process on each sub-block of the plurality of sub-blocks.

13. The method according to claim 12, wherein generating of the first refined motion vector and the second refined motion vector further includes at least one of:
   for each sub-block of the plurality of sub-blocks, performing an optical flow refinement process on the sub-block before the DMVR process is performed on the sub-block, and
   for each sub-block of the plurality of sub-blocks, performing an optical flow refinement process on the sub-block after the DMVR process is performed on the sub-block.

14. The method according to claim 12, wherein generating of the first refined motion vector and the second refined motion vector includes:
   performing the DMVR process on the at least one block,
   splitting the at least one block into a plurality of sub-blocks after the DMVR process is performed on the at least one block; and
   performing the DMVR process on each sub-block in the plurality of sub-blocks.

15. A method of processing visual media data, the method comprising:
   performing a conversion between a visual media file and a bitstream of a visual media data according to a format rule indicating that:
   video data includes at least one block and a syntax element indicating that the at least one block is to be predicted in a temporal interpolated prediction (TIP) mode, wherein the video data corresponds to, for the at least one block, a motion field is to be generated that includes a first motion vector that points to a first reference picture and a second motion vector that points to a second reference picture;

the video data further corresponds to a first refined motion vector and a second refined motion vector to be generated by using the first motion vector and the second motion vector in a decoder-side motion vector refinement (DMVR) process for the at least one block, based on a bilateral matching process; and wherein the bilateral matching process determines a first set of candidate motion vectors surrounding the first motion vector and a second set of candidate motion vectors surrounding the second motion vector, wherein the first refined motion vector is a candidate motion vector from the first set of candidate motion vectors that has a lowest distortion cost with respect to the first motion vector, and wherein the second refined motion vector is a candidate motion vector from the second set of candidate motion vectors that has a lowest distortion cost with respect to the second motion vector.

16. The method according to claim 15, wherein at least one candidate motion vector is determined based on a search range N, wherein N is an integer value corresponding to a number of luma samples.

17. The method according to claim 15, wherein at least one candidate motion vector is determined based on a search precision K.

18. The method according to claim 17, wherein the search precision K is one of a fractional value of a number of luma samples and an integer value corresponding to a number of luma samples.

19. The method according to claim 15, wherein generating of the first refined motion vector and the second refined motion vector includes:
   splitting the at least one block into a plurality of sub-blocks, and
   performing the DMVR process on each sub-block of the plurality of sub-blocks.

20. The method according to claim 19, wherein generating of the first refined motion vector and the second refined motion vector further includes at least one of:
   for each sub-block of the plurality of sub-blocks, performing an optical flow refinement process on the sub-block before the DMVR process is performed on the sub-block,
   for each sub-block of the plurality of sub-blocks, performing an optical flow refinement process on the sub-block after the DMVR process is performed on the sub-block,
   performing the DMVR process on the at least one block,
   splitting the at least one block into a plurality of sub-blocks after the DMVR process is performed on the at least one block; and
   performing the DMVR process on each sub-block in the plurality of sub-blocks.

\* \* \* \* \*